(12) United States Patent
Sanders

(10) Patent No.: US 12,235,052 B1
(45) Date of Patent: Feb. 25, 2025

(54) HEAT EXCHANGER BOLT ASSEMBLY

(71) Applicant: Leon Sanders, Auburn, WA (US)

(72) Inventor: Leon Sanders, Auburn, WA (US)

( * ) Notice: Subject to any disclaimer, the term of this patent is extended or adjusted under 35 U.S.C. 154(b) by 207 days.

(21) Appl. No.: 17/946,831

(22) Filed: Sep. 16, 2022

Related U.S. Application Data

(60) Provisional application No. 63/248,518, filed on Sep. 26, 2021.

(51) Int. Cl.
| | | |
|---|---|---|
| *F28F 3/08* | (2006.01) |
| *F16B 37/06* | (2006.01) |
| *F16B 37/12* | (2006.01) |
| *F16B 37/14* | (2006.01) |
| *F16B 41/00* | (2006.01) |

(52) U.S. Cl.
CPC ............ *F28F 3/083* (2013.01); *F16B 37/061* (2013.01); *F16B 37/122* (2013.01); *F16B 37/145* (2013.01); *F16B 41/002* (2013.01)

(58) Field of Classification Search
CPC .... F16B 41/002; F16B 37/061; F16B 37/145; F16B 37/122
See application file for complete search history.

(56) References Cited

U.S. PATENT DOCUMENTS

| | | | | |
|---|---|---|---|---|
| 2,582,871 A | * | 1/1952 | Kintner | F28F 3/083 165/70 |
| 3,045,785 A | * | 7/1962 | Ferguson | F16B 5/02 403/14 |
| 3,218,906 A | * | 11/1965 | Dupree | F16B 41/002 411/533 |
| 3,279,303 A | * | 10/1966 | Shackelford | F16B 19/10 411/49 |
| 4,105,562 A | * | 8/1978 | Kaplan | B01D 29/52 210/232 |
| 4,477,209 A | * | 10/1984 | Hipkins, Jr. | E21D 21/008 405/259.1 |
| 4,559,996 A | * | 12/1985 | Andrieux | F28F 9/0219 165/145 |
| 4,975,014 A | * | 12/1990 | Rufin | F16B 35/00 403/30 |

(Continued)

FOREIGN PATENT DOCUMENTS

| | | | | |
|---|---|---|---|---|
| CN | 202254981 U | * | 5/2012 | ......... F28D 15/0275 |
| CN | 205878987 U | * | 1/2017 | |

(Continued)

OTHER PUBLICATIONS

Translation of DE102007020187A1 named Translation—DE102007020187A1 (Year: 2008).*

*Primary Examiner* — Paul Alvare
(74) *Attorney, Agent, or Firm* — Joseph Z. Ellsworth

(57) ABSTRACT

An apparatus for tightening the plates in a plate heat exchanger. The apparatus is a threaded bolt and threaded receiver that does not extend beyond the movable plate in the heat exchanger. The receiver is sealed from contamination from fluids used in the heat exchanger. A method of tightening the plates of a heat exchanger by torquing a bolt while restraining a distal end of a receiver and allowing the bolt protruding threads to be encompassed within the receiver. This may be accomplished by offsetting a treaded portion of the receiver from a lock bushing at the distal end of the receiver to prevent protruding threads from extending beyond the distal end.

15 Claims, 3 Drawing Sheets

(56) References Cited

U.S. PATENT DOCUMENTS

| | | | | |
|---|---|---|---|---|
| 5,040,917 | A * | 8/1991 | Camuffo | F16B 35/00 |
| | | | | 411/338 |
| 8,540,013 | B1 * | 9/2013 | Sanders | A23L 3/001 |
| | | | | 403/348 |
| 10,619,934 | B2 * | 4/2020 | Honnorat | F28F 9/0273 |
| 2008/0310933 | A1 * | 12/2008 | Ricciardo | F16B 39/10 |
| | | | | 411/389 |
| 2009/0095457 | A1 * | 4/2009 | Nyander | F28F 3/083 |
| | | | | 165/167 |
| 2011/0024082 | A1 * | 2/2011 | Bharne | F28F 9/005 |
| | | | | 165/95 |
| 2013/0284412 | A1 * | 10/2013 | Forstenius | F28F 9/0075 |
| | | | | 165/166 |
| 2018/0216404 | A1 * | 8/2018 | Fisher | E06B 9/90 |
| 2020/0084913 | A1 * | 3/2020 | Jia | F28D 1/035 |
| 2020/0165865 | A1 * | 5/2020 | Buccola | E06B 9/60 |
| 2020/0271394 | A1 * | 8/2020 | Rassmus | F28F 3/083 |

FOREIGN PATENT DOCUMENTS

| | | | | | |
|---|---|---|---|---|---|
| CN | 207816064 | U | * | 9/2018 | |
| DE | 102007020187 | A1 | * | 10/2008 | ............... F28D 9/00 |
| EP | 2474804 | A1 | * | 7/2012 | ............... F16B 43/00 |
| EP | 2589916 | A1 | * | 5/2013 | ............... F28F 3/083 |
| FR | 2925029 | A1 | * | 6/2009 | ........... B62D 25/147 |
| GB | 2041509 | A | * | 9/1980 | ............... F28F 3/083 |
| JP | 2000154621 | A | | 6/2000 | |
| KR | 622116 | B1 | * | 9/2006 | ............... F28D 9/00 |
| WO | WO-9923434 | A1 | * | 5/1999 | ............... F28F 3/083 |

* cited by examiner

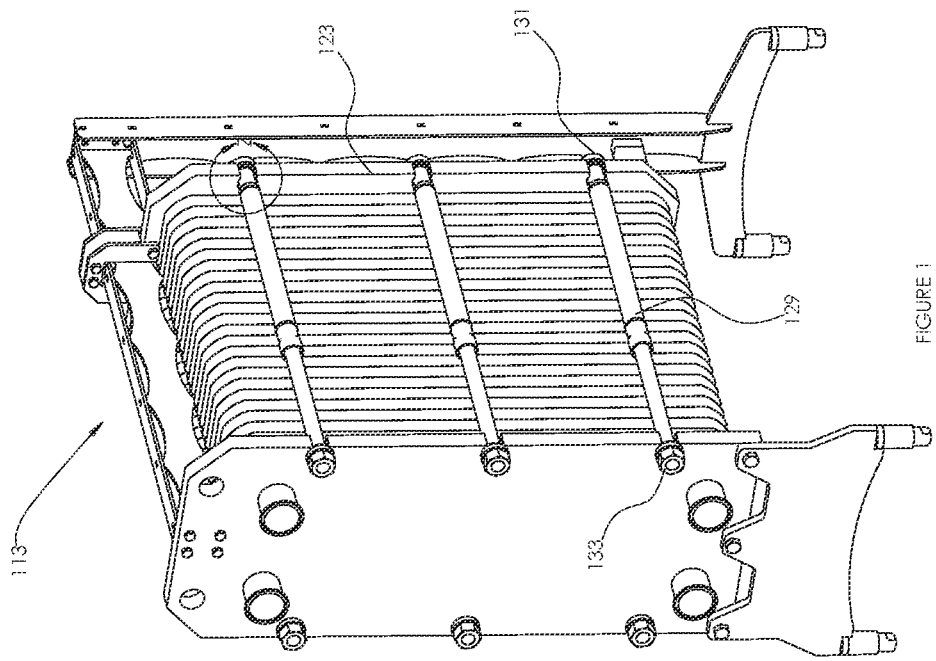
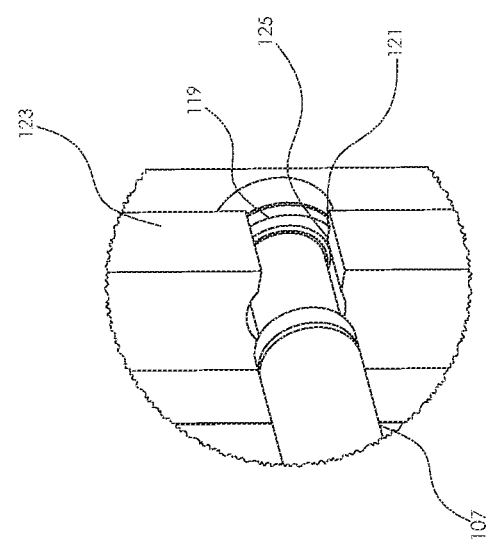

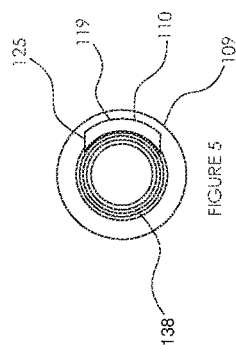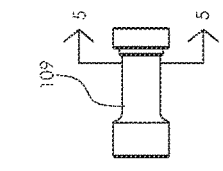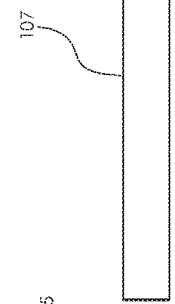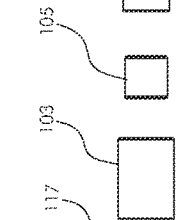

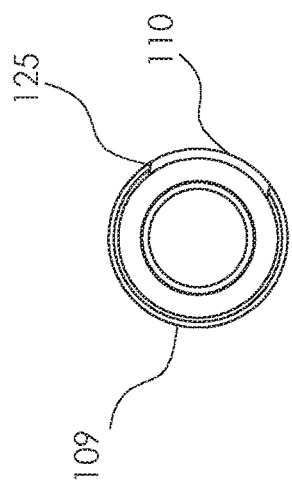
FIGURE 8
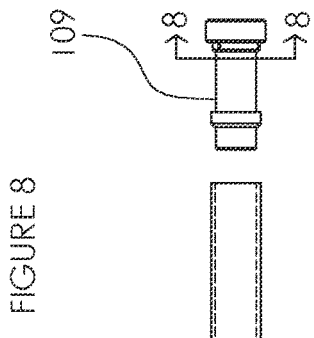
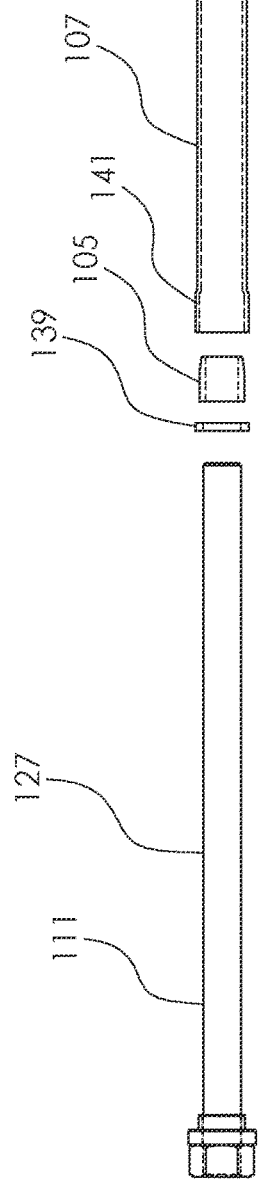
FIGURE 7
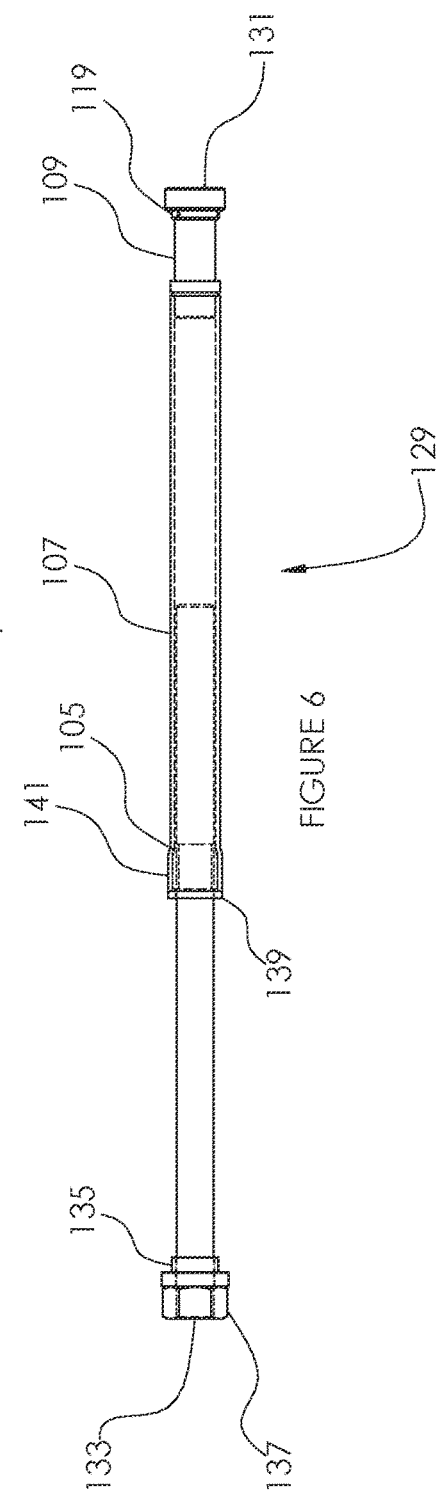
FIGURE 6

HEAT EXCHANGER BOLT ASSEMBLY

This application claims the benefit of U.S. Provisional Patent Application No. 63/248,518, filed Sep. 26, 2021, which is incorporated by reference herein in its entirety.

FIELD OF THE INVENTION

Fasteners for compressing plates in a plate heat exchanger assembly.

BACKGROUND

A typical heat exchanger assembly has a fixed cover and a movable cover that enclose the plate pack. A long tightening bolt passing between the movable cover and fixed cover is tightened to generate the pressure required to create a fluid tight seal between all the plates in a plate pack. The tightening bolts need to be long enough to support all the plates in their uncompressed condition. This means that when the plates are tightened down the threaded portion of the bolt can protrude past the movable plate between one to two feet. These six to eight bolts are dangerous to persons working in the area and increase the difficulty of coupling and uncoupling the pipes attached through the movable plate.

SUMMARY

A solution to some of the problems existing in the prior art are disclosed herein. A tightening bolt assembly that does not protrude past the movable plate eliminates many of the issues inherent in the prior art.

A heat exchanger may be compressed using a bolt that is tightened into a receiver having a pipe sleeve configured to conceal the protruding threads of the bolt.

Compressing the plates of a heat exchanger may be accomplished by torquing a bolt while restraining a distal end of a receiver whereby the bolt protruding threads are encompassed within the receiver. The treaded portion of the receiver may be offset from a lock bushing at the distal end of the receiver to prevent protruding threads from extending beyond the distal end.

BRIEF DESCRIPTION OF THE DRAWINGS

FIG. 1: Isometric view of a heat exchanger assembly having the bolt assembly of the current invention.

FIG. 2: Isometric detail view of the lock bushing in use in a heat exchanger.

FIG. 3: Exploded view of the bolt and retainer assembly.

FIG. 4: Plan view of the bolt and retainer assembly.

FIG. 5: Cut view of one end of bolt assembly.

FIG. 6: Plan view of bolt retainer

FIG. 7: Exploded view of an alternate bolt and retainer assembly

FIG. 8: Cut view of a bolt assembly end.

DETAILED DESCRIPTION

A receiver 101 comprising a nut coupler 103 having a threaded insert 105, pressed, bonded or welded inside the nut coupler 103, a pipe sleeve 107 coupled to the nut coupler 103, and a lock bushing 109 coupled to the distal end of the pipe sleeve 107. The pipe sleeve 107 is configured to conceal the protruding threads 112 of the bolt 111 as it is tightened. Protruding threads 112 are the threaded portion of a bolt that has passed through the nut coupler 103.

In the preferred embodiment the pipe sleeve 107, nut coupler 103 and lock bushing 109 are made from stainless seal and welded together and the threaded insert 105 is made from a dissimilar non-galling material such as Nickle Aluminum Bronze (NAB).

The Nickle Aluminum Bronze threaded insert 105 to prevent galling of stainless thread bolt 111 on stainless thread nut. The NAB threaded insert 105 has good lubricity and prevents galling for long term use over many cycles.

The heat exchanger 113 is used primarily in the sanitary industry and must be kept clean. A plastic seal nut 115 in combination with an O-ring 117 on the nut coupler 103 prevents fluids from getting into the receiver 101. The plastic seal nut 115 is threaded onto a bolt 111 prior to threading the bolt 111 into the receiver 101. After the bolt 111 is in place and heat exchanger 113 is assembled and sealed, then the plastic nut 115 is tightened down onto the nut coupler 103 and compresses the O-ring 117.

The heat exchanger bolt assembly 129 has a first end 131 and a second end 133. The first end 131 comprises a lock bushing 109. The lock bushing 109 on the end of the receiver 101 has a shoulder 119 that acts as a key and fits into a notch 121 on the movable plate 123 which prevents turning of the receiver 101 as the bolt 111 is tightened. The shoulder 119 is piece of material having parallel sides 125 projecting away from the lock bushing 109. The parallel sides 125 fit into a similar shaped notch 121 in the movable plate, wherein the parallel sides of the notch are tightly adjacent to the parallel sides 125 of the lock bushing 109. The lock bushing 109 has a bushing portion 138 that centers the receiver 101 in the movable head 123

The second end 133 may have a hexagonal head 137 for tightening the bolt 111. The means for tightening the bolt 111 may also be a Torx head, hexagonal socket head, or twelve-point bolt. The bolt 111 may also have a bushing 135 to center the bolt 111 in the heat exchanger 113.

FIGS. 6 and 7 show an alternate embodiment of a four-piece receiver 101 comprising a flared portion 141 of the pipe sleeve 107 and having a threaded insert 105, pressed, bonded or welded inside the flared portion 141. A lock bushing 109 is coupled to the distal end of the pipe sleeve 107 opposite the flared portion 141. The lock bushing may be inserted into the pipe sleeve 107 and secured by press fit, bonding or welding. In the preferred embodiment the pipe sleeve 107, and lock bushing 109 are made from stainless seal and welded together and the threaded insert 105 is made from Aluminum Nickle Bronze.

The Nickle Aluminum Bronze (NAB) threaded insert 105 to prevent galling of stainless thread bolt 111 on stainless thread nut. The NAB threaded insert 105 has good lubricity and prevents galling for long term use over many cycles.

A keeper washer 139 prevents the threaded insert 105 from departing the flared portion 141. Keeper washer 139 is welded to the end of the flared portion 141 of the pipe to lock the female threaded insert 105 in place. The threaded insert 105 expands one side of the pipe while providing the inner threads for the bolt. The threaded insert 105 may be pulled into the pipe to both form the pipe and create in interference fit, which is why only one side of the pipe is expanded. Keeper washer 139 is attached to pipe sleeve 107 with a complete fillet weld around the perimeter.

Threaded insert 105 may also be held inside pipe sleeve 107 by being press fit and then the locking washer 139 is welded with a fillet weld around the flared portion 141 to prevent the threaded bushing from being pulled out.

In an example embodiment, an apparatus for tightening a heat exchanger 113 comprises, a bolt 111 and a receiver 101, wherein the receiver comprises a pipe sleeve 107 configured to conceal the threads 127 of the bolt 111 as it is tightened. Also, the apparatus further comprises, a coupler housing 103 and threaded insert 105, wherein the coupler housing 103 is coupled to the pipe sleeve 107. Further, the threaded insert 105 may be pressed into the coupler housing 103 or the threaded insert 105 may be welded to the coupler housing 103. The pipe sleeve 107, the lock bushing 109 and the coupler housing 103 may be welded, brazed or interference fit together. The lock bushing 109 comprises a locking feature 110 to prevent rotation of the receiver 101 when the bolt 111 is tightened. The locking feature may be two parallel edges 125 forming a key 119 configured to engage a keyway 121 on a heat exchanger movable head 123. The locking feature may be a square section configured to engage an open-ended square section on a heat exchanger movable head 123. The heat exchanger bolts 111 do not extend beyond a movable head 123 when the heat exchanger is ready for use. To prevent contamination, the receiver 101 is sealed from liquid contamination. This may be done by utilizing a seal nut 115 and an O-ring 117. The seal nut 115 holds the O-ring 117 against the receiver 101 to create a fluid tight seal. A heat exchanger 113 may utilize the described apparatus to compress the plates in a plate heat exchanger. In the best mode a heat exchanger would comprise a plurality of the described apparatus.

A further example embodiment is a method of tightening a heat exchanger 113 comprising, torquing a bolt 111, restraining a distal end of a receiver 101, encompassing a bolt thread 127 with in the receiver 101. Further, the method comprises, sealing the receiver 101 from fluid contamination with a seal nut 115 and O-ring 117. The example embodiment May further comprise, pressing a threaded insert 105 of a different material into the receiver 101 to prevent galling of the threads 127 as the bolt 111 is torqued. The threaded insert 105 may be made from Nickle aluminum Bronze (NAB). The step of restraining the distal end of the receiver 101 further comprises, inserting a key shaped portion 110 of the receiver 101 into a keyway portion 121 of a movable head 123.

A further embodiment of an apparatus for compressing a heat exchanger 113 comprises a bolt 111 and a receiver 107, wherein the receiver 101 comprises a pipe sleeve 107 configured to conceal the protruding threads 112 of the bolt 111 as it is tightened. A threaded insert 105 may be coupled within a flared portion 141 of the pipe sleeve 107. A keeper washer 139 may be welded all the way around the flared portion 141 of the pipe sleeve 107 configured to keep the threaded insert 105 from departing the flared portion 141. The receiver 101 may comprise a pipe sleeve 107 and a lock bushing 109. The threaded insert 105 is spaced apart from the lock bushing 109 such that the threaded portion of the bolt 127 will fit between the threaded insert 105 and the lock bushing 109. The pipe sleeve 107 and the lock bushing 109 may be welded together. The lock bushing 109 comprises a locking feature 110 to prevent rotation of the receiver 101 when the bolt 111 is tightened. The locking feature 110 may be two parallel edges 125 forming a key configured to engage a keyway 121 on a heat exchanger movable head 123. The locking feature 110 is a square section configured to engage an open-ended square section 121 on a heat exchanger movable head 123. The receiver 107 is configured prevent the protruding threads 112 of the bolt 111 from extending beyond a movable head 123 when the heat exchanger is ready for use. The heat exchanger is ready for use when the bolt is tightened to the correct torque. A keeper washer 139 and threaded insert 105 may seal the receiver from liquid contamination. Alternately, a seal nut 115 holds an O-ring 117 against the receiver 101 to create a fluid tight seal. Further alternately the threaded portion of the receiver 101 may be, a coupler housing 103 and threaded insert 105, which are coupled to the pipe sleeve 107. A Heat exchanger 113 may comprise the bolt assembly 129 to process fluids for human consumption and keep the walkways safe by not having a large threaded end of a bolt projecting out past the moveable plate of the heat exchanger.

A heat exchanger must be tightly torqued to become fluid tight. A method of tightening a heat exchanger comprises torquing a bolt, restraining a first end 131 of a receiver 101 and, encompassing the bolt protruding threads 112 within the receiver 101. This may be accomplished by offsetting a threaded insert 105 of the receiver 101 from a lock bushing 109 at the first end 131 of the receiver 101 to prevent protruding threads 112 from extending beyond the first end 131. The entire bolt 111 is confined between the first end 131 and the second end 133 of the bolt assembly 129. The receiver 101 may be made by pulling a threaded insert 105 of a different material into the pipe sleeve 107 of the receiver 101. The outside diameter of the threaded insert 105 is larger than the inner diameter of the pipe sleeve 107 so a flared a portion 141 of the receiver results from pulling the threaded insert 105 into pipe sleeve 107. Restraining the first end 131 may be accomplished by inserting a key shaped portion 119 of the receiver into a keyway portion 121 of a movable head 123. A safety measure of welding a keeper washer 139 to a flared portion 141 of a pipe sleeve 107 to prevents the threaded insert 105 from departing under high tension loads. The receiver 101 may further comprise a pipe sleeve 107 and a locking bushing 109 wherein, the pipe sleeve 107 is of sufficient length that the threads 127 of a tightened bolt 111 do not extend beyond the locking bushing 109 at the first end 131.

The locking bushing 109 is shown as a separate piece that is fabricated and then swaged, welded or bonded in place to the pipe sleeve 107. This same function may be accomplished by necking down the pipe sleeve 107 and coupling a locking feature 110 to the pipe sleeve 107. The locking feature 110 may be hex head, spline, or pin. On the moveable head 123 a corresponding feature engages the locking feature 110 to prevent rotation such as a female spline, a hex recess or an aperture for a pin to engage. The locking feature 110 may also extend beyond the movable head 123 and rotation is prevented using a wrench or similar tool.

The invention claimed is:

1. An apparatus for compressing a heat exchanger comprising,
    a bolt,
    a receiver,
    wherein the receiver comprises a pipe sleeve configured to conceal the protruding threads of the bolt as it is tightened,
    a threaded insert press fit or swaged within an expanded portion of the pipe sleeve,
    a keeper washer welded to the expanded portion of the pipe sleeve and extending in a radial direction wherein, the keeper washer overlaps at least a portion of the threaded insert when viewed along the central axis of the pipe sleeve.
2. The apparatus of claim 1 wherein,
    the receiver comprises a pipe sleeve, and a lock bushing.

3. The apparatus of claim 2 wherein,
the threaded insert is spaced apart from the lock bushing such that the threaded portion of the bolt fits between the threaded insert and the lock bushing.

4. The apparatus of claim 3 wherein,
the pipe sleeve and the lock bushing are welded together.

5. The apparatus of claim 1 further comprising,
a lock bushing,
wherein the lock bushing comprises a locking feature to prevent rotation of the receiver when the bolt is tightened.

6. The apparatus of claim 5 wherein,
the locking feature is two parallel edges forming a key configured to engage a keyway on a heat exchanger movable head.

7. The apparatus of claim 5 wherein,
the locking feature is a square section configured to engage an open-ended square section on a heat exchanger movable head.

8. The apparatus of claim 1 wherein, the protruding threads of the bolt is configured to not extend beyond a movable head.

9. The apparatus of claim 1 wherein,
the keeper washer and threaded insert seals an interior of the receiver from liquid contamination.

10. A heat exchanger comprising the apparatus of claim 1.

11. A method of tightening a heat exchanger comprising,
torquing a bolt,
restraining a distal end of a receiver,
encompassing the bolt protruding threads within the receiver,
swaging or press fitting a threaded insert of a different material into the receiver and,
welding a keeper washer to an expanded portion of a pipe sleeve wherein, the keeper washer extends in a radial direction and overlaps at least a portion of the threaded insert when viewed along the central axis of the pipe sleeve.

12. The method of claim 11 further comprising,
offsetting a threaded insert within the receiver from a lock bushing at the distal end of the receiver to prevent protruding threads from extending beyond the distal end.

13. The method of claim 11 wherein,
the threaded insert acts as a mandrel,
expanding a portion of the receiver as a result of pulling the threaded insert.

14. The method of claim 11 wherein,
the restraining step further comprises,
inserting a key shaped portion of the receiver into a keyway portion of a movable head.

15. The method of claim 11 wherein,
the receiver further comprises a pipe sleeve and a locking bushing wherein,
the pipe sleeve is of a length that the threads of a tightened bolt do not extend beyond the locking bushing.

* * * * *